United States Patent

[11] 3,566,216

[72] Inventors Gerhard Doering
Stow;
Charles Kadlec, Acton, Mass.

[21] Appl. No. 750,857
[22] Filed Aug. 7, 1968
[45] Patented Feb. 23, 1971
[73] Assignee Stow Laboratories, Inc.
Stow, Mass.

[54] AN ELECTROMECHANICAL TRANSDUCER INCLUDING A SEMICONDUCTOR AND SENSITIVITY CONTROLLING COUPLING MEANS
7 Claims, 16 Drawing Figs.

[52] U.S. Cl. .......... 317/235, 317/234, 307/308
[51] Int. Cl. .......... H01l 11/00, H01l 15/00
[50] Field of Search .......... 317/234, 235, (4), (26); 307/308; 179/100.2

[56] References Cited

UNITED STATES PATENTS

| | | | |
|---|---|---|---|
| 3,215,787 | 11/1965 | Hill | 317/235 |
| 3,302,269 | 2/1967 | Cooper et al. | 317/235 |
| 3,403,307 | 9/1968 | Rindner | 317/235 |
| 3,404,243 | 10/1968 | Krieger et al. | 317/235 |
| 3,433,904 | 3/1969 | Kowalik | 317/235 |
| 3,435,157 | 3/1969 | Longwell | 317/235 |
| 3,480,740 | 11/1969 | Matsumoto | 317/235 |

*Primary Examiner*—John W. Huckert
*Assistant Examiner*—Andrew J. James
*Attorney*—Kenway, Jenney and Hildreth

ABSTRACT: A piezojunction transducer assembly wherein an electrical output is produced by an applied mechanical load coupled to the junction by means of a stylus supported by a diaphragm. Variation of the force applied to the junction by the stylus results in reversible changes in the junction's characteristics, thereby causing an electrical output signal at the output terminals.

The basic device is modified by an additional structural element attached to the diaphragm. By selection of the location of the contact between the structural element and the diaphragm, the effective distribution of the applied force or pressure is modified, which changes the proportion of the total load supported by the stylus and the diaphragm support, thereby changing the range of mechanical input over which the device will have useful output.

In a preferred embodiment, the structural element is a convex circular dome attached along its periphery to a concave diaphragm.

INVENTORS
GERHARD DOERING
CHARLES KADLEC
BY
Kenway, Jenney & Hildreth
ATTORNEYS

INVENTORS
GERHARD DOERING
CHARLES KADLEC
BY
Kenway, Jenney & Hildreth
ATTORNEYS

INVENTORS
GERHARD DOERING
CHARLES KADLEC
BY
Kenway, Jenney & Hildreth
ATTORNEYS

INVENTORS
GERHARD DOERING
CHARLES KADLEC
BY
Kenway, Jenney & Hildreth
ATTORNEYS

AN ELECTROMECHANICAL TRANSDUCER INCLUDING A SEMICONDUCTOR AND SENSITIVITY CONTROLLING COUPLING MEANS

FIELD OF THE INVENTION

This invention relates in general to electromechanical transducers and more particularly to a transducer assembly in which a semiconductor junction is stressed by the mechanical input.

BACKGROUND OF THE INVENTION

There are a number of different pressure transducers in the art which perform the function of translating a mechanical signal to an electrical signal. These transducers operate on a number of different principles, such as change of electrical properties of a conductor, variations in capacity resulting from mechanical displacement and piezoelectric or magnetostrictive effects. Various forms of these transducers have proven useful in particular environments and over particular pressure or force ranges.

One other recently developed transducer utilizes the anisotropic stress effect in a semiconductor junction as the basis for the translation of a mechanical force to an electrical signal. In this type of transducer, localized pressure on a semiconductor surface parallel to the plane of a junction between two areas of different conductivity type produces large, reversible changes in the characteristics of the junction. Transducers utilizing this effect are described in a number of United States Letters Patents including U.S. Pat. No. 3,339,035, U.S. Pat. No. 3,283,271, U.S. Pat. No. 3,270,555 and others.

This transducer has proven very useful because of its high sensitivity, wide dynamic range, linearity, high signal level and stability over a variety of environmental conditions. In addition it lends itself naturally to miniaturization and to combination with microcircuitry. One assembly of such a transducer is described in pending U.S. Pat. application Ser. No. 501,254 and now abandoned and one embodiment is shown in axial sectional view in FIG. 1 herein.

In that construction of the piezojunction transducer, a semiconductor chip including a region of a first conductivity type 18 separated by a planar junction 16 from a region of a second conductivity type 20 has pressed upon it the pointed end of a stylus 13. The chip is mounted on a header 10 and a small cylindrical ring 12 is also mounted on the header surrounding the chip. A metallic membrane or diaphragm 26 is fastened across the open end of the cylinder and the blunt end of the pointed stylus 13 is attached, typically by epoxy 19, to the center of this diaphragm. The header may be provided with openings 14 so that pressure from the outside face of the header may pass through to the inner side of the diaphragm; or the case may be sealed for absolute pressure measurement. Electrical connection to the semiconductor may be made through insulated lead 15 to the region 18 and through pin 17 and header 10 to region 16. For multiple-junction devices such as transistors, additional leads are arranged similarly to lead 15.

Pressure exerted upon the diaphragm from either side results in a change in the force exerted through the tip of the stylus 13 onto the semiconductor surface and the underlying junction. Because of the anisotropic stress effect, a change in the stress at the junction results in a change of the junction's characteristics and hence in a change of the electrical signal.

Since there must be an initial net compressive force on the stylus for the transducer to operate as a bidirectional device, a bias force is required. This bias or preload is provided by a deflection of the diaphragm during construction so that upon completion of the assembly, the zero-load operating point of the device is approximately in the middle of the linear portion of the voltage-pressure characteristic.

In practice, it has been found that this type of transducer assembly is limited to a maximum differential pressure range of about 1 p.s.i.d. At pressures below 1 p.s.i.d., a relatively high compliance diaphragm is suitable. Typically, the diaphragm 26 may be formed from a beryllium copper sheet 0.0015 inch thick mounted on a ring 12 made from Kovar 0.007 inch thick. The compliance of this diaphragm is much higher than the compliance of any other part of the assembly. In order to bias the device as described above, the center of this diaphragm must be deflected about 300 microinches. Variations in temperature result in small dimensional changes of all the parts. For example, the axial dimensional change of the epoxy 19 is about 3 microinches for a temperature change of 50° C. which is a significant fraction of the diaphragm preload deflection, and therefore produces a noticeable change in the bias force and the resultant zero setting of the device. The thermally induced dimensional changes of the other parts of the assembly are equally significant.

If an attempt is made to decrease the sensitivity by use of a more rigid diaphragm, the thermally induced dimensional changes become even more significant, since the deflection of such a diaphragm, necessary to obtain the correct bias becomes smaller and therefore the thermally induced dimensional changes become proportionally larger and may actually exceed the bias deflection, even for small temperature changes, which make such an arrangement lose its practical usefulness. Thus this method of sensitivity modification, well-known in the transducer art, has not proven suitable for piezojunction devices which have therefore been restricted to operation over very low differential pressure ranges.

Figure 1:
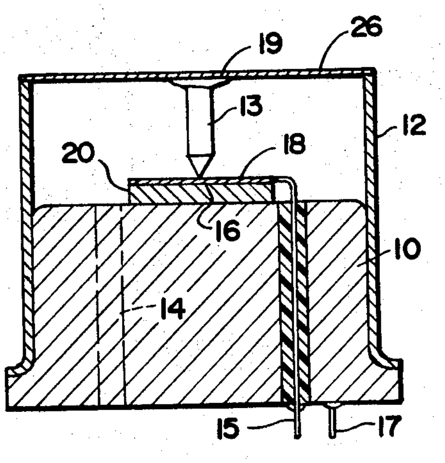
FIG. 1 PRIOR ART
FIG. 1 is an axial sectional view of a prior art transducer assembly.
Figure 2:
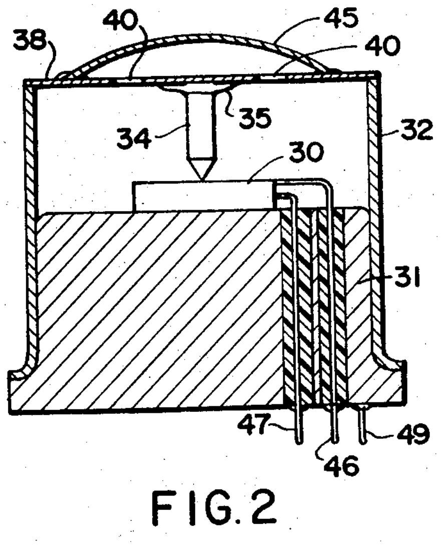
FIG. 2 is an axial sectional view of a transducer assembly embodying the principles of this invention.
Figures 3A, 3B, 3C:
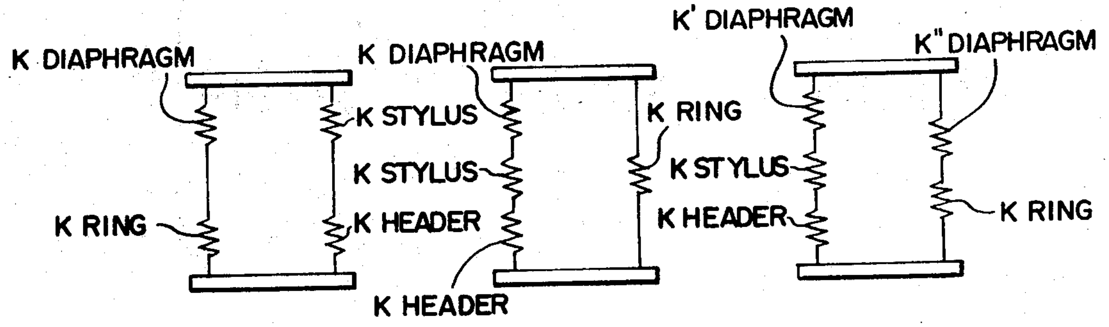
Figure 3A:
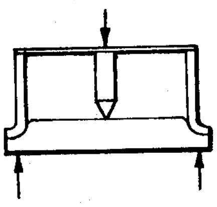
Figure 3B:
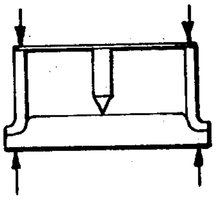
Figure 3C:
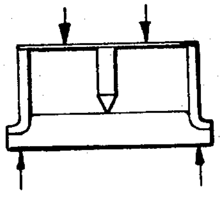
Figure 2A:
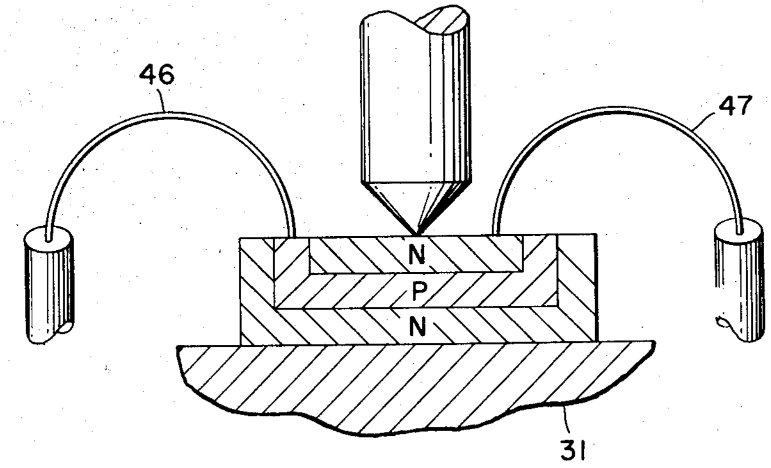
Figure 4:
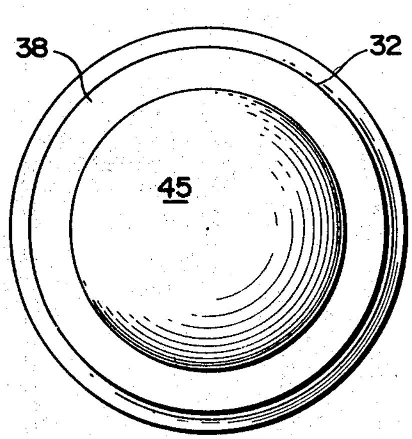
Figure 5:
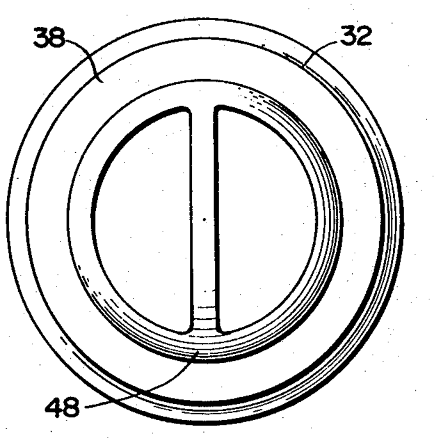
Figure 6:
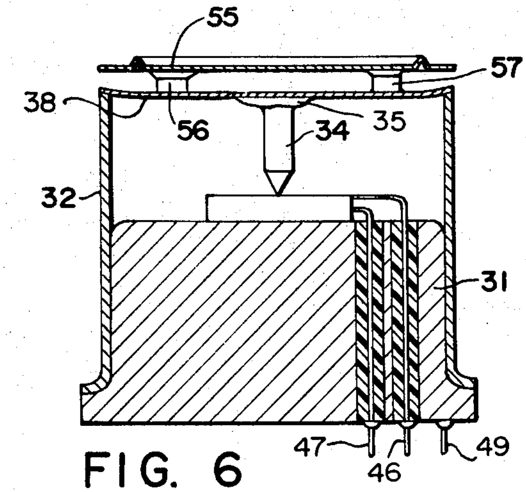
Figure 9:
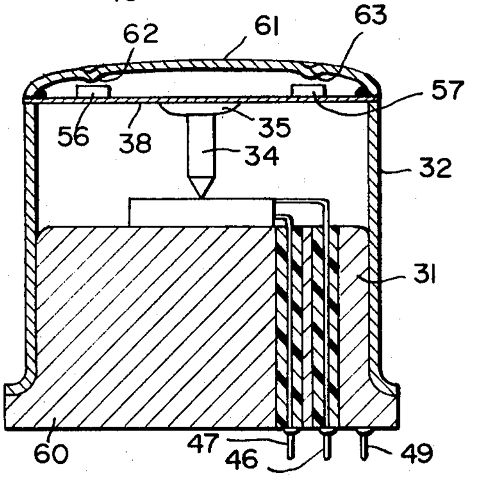
Figure 7:
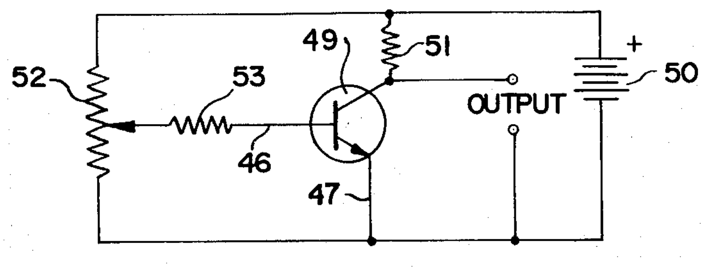
Figure 8:
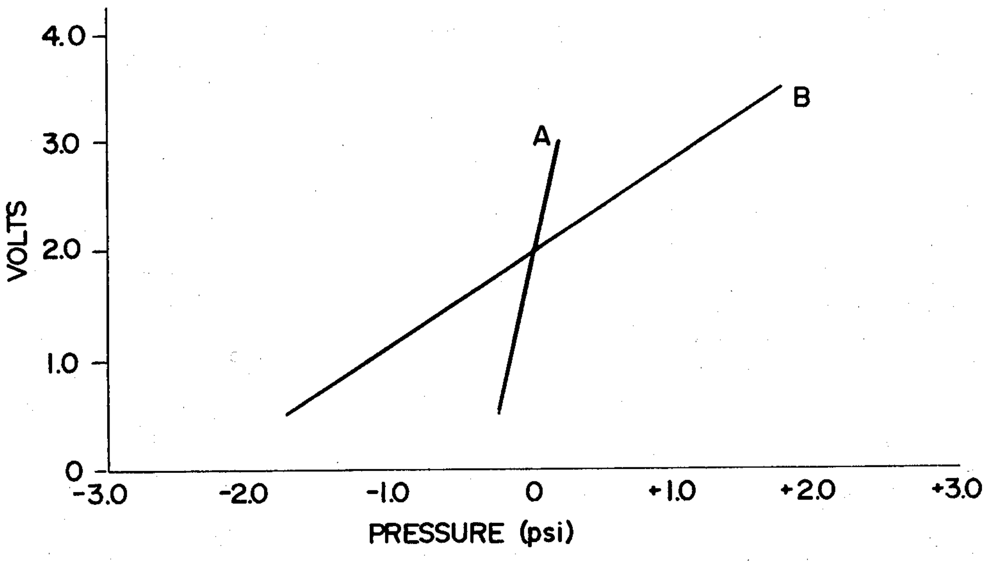

FIG. **2*a* is an enlarged view of one embodiment of the semiconductor of FIG. 2**;

FIG. **3*a*, 3*a*', 3*b*, 3*b*', 3*c* and 3*c*' are schematic representations of the spring constant model and force diagrams equivalent to the application of force at various points in the assembly of FIG. 1**;

FIG. 4 is a plan view of the assembly of FIG. 2;

FIG. 5 is a plan view of a second embodiment of a transducer assembly constructed in accordance with the principles of this invention;

FIG. 6 is an axial sectional view of still another embodiment of a transducer assembly constructed in accordance with the principles of this invention;

FIG. **6*a* is a plan view of the assembly of FIG. 6**;

FIG. 7 is a schematic illustration of a typical circuit configuration;

FIG. 8 is a graphical representation of the voltage-pressure characteristics of both a prior art transducer assembly and a transducer assembly constructed in accordance with the principles of this invention; and FIG. 9 is an axial view of another embodiment of a transducer assembly constructed in accordance with the principles of this invention.

SUMMARY OF THE INVENTION

Broadly speaking, the transducer of this invention is formed by the addition to the diaphragm of the prior art assembly of a structural element which transmits the applied external force or pressure to the diaphragm at a number of discrete points displaced from the location of the stylus. The structural element is made either sufficiently rigid, and having a sufficient clearance from the diaphragm in the axial direction to preclude any changes in the location of the contact with the diaphragm when the load is applied, or, in a different embodiment of this invention, the structural element is purposely made to change its shape and hence its contact with the diaphragm when the mechanical load is applied, thereby further modifying the relationship between the mechanical input and the electrical signal.

One suitable element of the first type is a convex dome which is attached to the concave diaphragm only at its (the dome's) periphery. The diameter of this dome can be as large or smaller than the diameter of the diaphragm. With this arrangement, the mechanical load is proportionally divided between the stylus and the supporting ring; as the diameter of the dome is increased, the ring is made to support a larger portion of the total mechanical load, while the load to the stylus decreases. The total load which the transducer is capable of sensing is therefore increased, i.e. the sensitivity of the transducer is decreased as desired. However, the compliance of the diaphragm is only slightly reduced by the addition of the dome, and hence the amount of diaphragm deflection required for biasing remains approximately the same as for the high sensitivity assembly of the prior art, and accordingly the assembly of this invention is not significantly more sensitive to thermally induced changes than the prior art devices.

In order to have the symmetrical response and high common-mode pressure rejection desirable in both differential pressure transducers and in force transducers, the main diaphragm must have at least one opening within the area of the dome to permit the interior (reference) pressure to be exerted against the inner face of the dome, while the second applied pressure is exerted against the opposite (external) surface of the dome.

When the transducer is to be used for pressure measurement, the contact between the dome and the diaphragm must be continuous and provide a seal between the internal and external volumes. For force or load measurement, the dome and the diaphragm need not be continuous surfaces, nor does the contact between the dome or other similar structural element of this invention, and the diaphragm, need be continuous and form a seal.

DESCRIPTION OF PREFERRED EMBODIMENTS

With reference now to FIG. 2, there is illustrated a transducer assembly embodying the principles of the invention. A semiconductor 30 is mounted upon a header 31 and a supporting round cylindrical ring 32 also is mounted on the header. A stylus 34 has one end pressed upon a surface of the semiconductor and the opposite end attached by epoxy 35 to approximately the center of a diaphragm 38, the latter being fastened, typically by soldering, to the ring 32. The diaphragm 38 is formed with openings 40 through it. An additional dome or disc 45 is attached along its periphery to the diaphragm 38. As is more clearly seen in FIG. 4, the dome 45 is of equal or smaller diameter than the supporting ring 32. The semiconductor chip may typically be formed in any suitable configuration containing at least one PN junction parallel to and closely underlying the surface upon which the stylus bears. A typical semiconductor, as illustrated in FIG. *2a*, is a silicon NPN planar transistor with the stylus stressing the emitter-base junction. Electrical connections to this semiconductor are provided through contacts 46, 47 and 49. The basic assembly may be formed using any of a number of materials and/or dimensions. The chief criterion is that the compliances of the ring 32, stylus 34, semiconductor 30 and header 31 be substantially lower than that of the diaphragm 38. Kovar has been found to be suitable material for both the header and supporting ring. Typical dimensions are an internal diameter of the ring of .170 inches with a .007 inch thick wall. The stylus 34 may be formed of either a uniformly hard material or of a reasonably hard material such as steel with a diamond tip. The epoxys used to attach the stylus 34 and the dome 45 to the diaphragm 38 are all conventional.

A typical circuit configuration for use with the above-described transducer is shown in FIG. 7. A voltage supply 50, which may typically be 10 volts, provides the collector voltage through collector resistor 51, and the base bias voltage through potentiometer 52 and resistor 53. The potentiometer 52 and resistors 51 and 53 are typically $10^4$ ohms each.

The collector-emitter voltage versus pressure characteristic of the assembly of FIG. 2 in the circuit of FIG. 7 without the modifying dome 45 is illustrated as curve A in FIG. 8. In this assembly the diaphragm 38 was formed of .0015 inch thick beryllium copper of .185 inch diameter. As shown, the sensitivity of this assembly is about 7.0 volts/p.s.i. in the linear operating range.

In the assembly of the present invention, a nickel dome .005 inch thick and .120 inch in diameter was attached to this diaphragm 38 and openings 40 were made through diaphragm 38 to permit the pressure to be applied directly to the underside of the dome 45. The collector-emitter voltage versus pressure characteristic of this modified assembly, as illustrated in FIG. 2, is shown as curve B in FIG. 7. The sensitivity in this instance is 0.8 volts in the linear operating range, a reduction in sensitivity of almost 9 to 1.

The theoretical basis for the changes in sensitivity achieved in the above described device may better be understood with reference to the equivalent models in FIGS. *3a*, *3b* and *3c* and the force diaphragms in FIGS. *3a'*, *3b'*, and *3c'*. In these diagrams the compliances of the elements are represented as spring constants. In all cases the diaphragm is assumed to be simply supported along the edges of the header. FIG. *3a* and *3a'* show the equivalent model and force diagram for a point force applied at the center of the diaphragm directly above the stylus. The compliance of the stylus is in series with the compliance of the header and this series combination is in parallel with a second series combination which includes the compliance of the diaphragm and the compliance of the ring. When the diaphragm 38 has a high compliance, it appears as the equivalent of a soft spring between the point of applied force and the support. Accordingly, the dominant force path is through the stylus and header and substantially none of the applied force is transmitted through the diaphragm and ring path.

In FIG. *3b* and FIG. *3b'*, there are shown the equivalent model and force diagram for a force applied at the periphery of the diaphragm 38 directly above the ring 32. In this instance, all spring constants have the same values as those in FIG. *3a* and *3a'*, but now the spring constants of the diaphragm, the stylus and the header are in series between the point of applied force and the support and, in parallel with these, is only the spring constant of the ring. Again, where the diaphragm has a relatively high compliance compared to that of the ring 32, the force path directly through the ring dominates and substantially no force is transmitted along the path of the diaphragm and stylus to the header.

In FIG. *3c* and FIG. *3c'*, the equivalent model and force diagram are shown for the situation where the force is applied somewhere between the center of the diaphragm and the periphery. In this circumstance, one force path is a series combination of the spring constants of the header, the stylus and that portion of the diaphragm which lies between the point of applied force and the stylus. In parallel with this is the force path which includes the spring constants of the ring and of that part of the diaphragm which lies between the point of applied force and the periphery of the diaphragm. In the situation illustrated in FIGS. *3c* and *3c'*, the force is distributed between the two paths according to their relative compliance. In other words, the distribution of the applied force between the stylus and the ring will depend on the position along the radius of the diaphragm at which the force is applied. Thus if the dome 45 is added and a uniform external pressure is applied to the device, the dome will produce a force at its contact with the diaphragm equivalent to the sum of the pressure over its area. This force distribution is very much like the one shown in FIG. *3c*, except for a small additional force generated by the pressure acting on the still-exposed portion of the diaphragm. The net sum of these forces will determine the sensitivity of the device.

From the above description, it follows that as the dome is made larger, a greater portion of the total applied force is reacted by the ring and that the transducer can thereby tolerate a higher total load while the forces transmitted to the junction by the stylus remain unchanged.

Figure 6A:
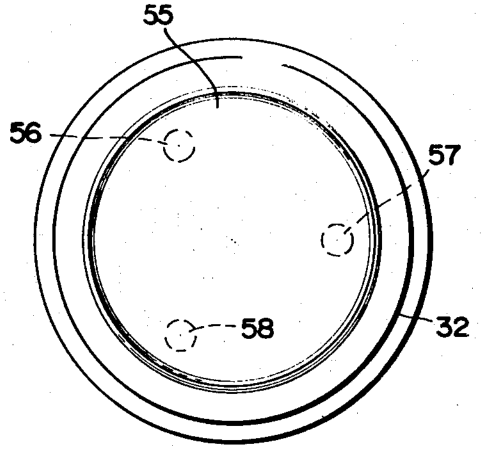

For sensing force rather than a pressure, the configuration shown in plan view in FIG. 5 may be more suitable. In the embodiment of FIG. 5, a skeletonized form 48 of the dome is attached to the diaphragm 38 to distribute the force which would then be directly coupled to this skeletonized form. This embodiment will operate in all other respects in the same fashion as that shown in FIG. 4. In the configuration shown in FIGS. 2 and 5, the force is applied at a series of points forming a line defined by the periphery of the dome. The coupling member may, however, be attached only at one or more specific points in some arrangements. Such a construction is illustrated in FIGS. 6 and 6a in which a second diaphragm 55 is supported at three separate points 56, 57 and 58 on diaphragm 38. Again in this configuration the applied force is distributed between the stylus and ring depending upon the placement of the contact points.

In the description of the preferred embodiments, the dome is shown with a circular configuration, however, other geometric configurations may be employed. Similarly, the main diaphragm may be skeletonized or of noncircular geometry.

In the embodiments illustrated the semiconductor chip has been shown as mounted on the header and the stylus attached to the diaphragm with its point pressed upon the semiconductor surface near the junction. This basic portion of the assembly may be varied without changing the principles of the present invention. For example, the planar junction may be stressed by being raised above the surface in the so-called "-mesa" configuration and a blunt stylus pressed directly on it. Also, the device may be constructed with the semiconductor attached to the diaphragm and the stylus blunt end attached to the header. In any of these variations, the addition of the structural element to the diaphragm results in a decrease in sensitivity.

The addition of a dome as illustrated in the above embodiments has produced transducers suitable for operation in the range from 1 to 100 p.s.i.d.

In FIG. 9 there is illustrated still another embodiment of the invention. In this embodiment a dome 61 is attached at its periphery to the periphery of diaphragm 38. The dome 61 is formed with protruding dimples 62 and 63 located at a diameter less than the full diameter of the dome. A pair of studs 56 and 57 are located on the diaphragm 38 in a position to contact the dimples 62 and 63, when the dome 61 is flexed sufficiently. In this arrangement then the load is distributed at the outer diameter until the force of the load becomes sufficient to flex the dome 61 so that the dimples 62 and 63 come into contact with studs 56 and 57. While this load or a greater load is maintained the distribution of the load between the stylus 34 and the ring 32 will be controlled by the location of the studs, thus increasing the sensitivity, while at lesser values of load, the load distribution is controlled by the outer diameter of the dome 61, and the transducer will be less sensitive.

Having described the invention various modifications and improvements will occur to those skilled in the art and the invention should be construed as limited only by the spirit and scope of the appended claims.

We Claim:

1. A pressure transducer assembly for producing an electrical output related to an applied pressure comprising:

A transducing subassembly including a semiconductor formed with a region of a first conductivity type, a region of a second conductivity type and a PN junction therebetween, and force applying means having a first end and a second end, said first end being impressed upon a surface of said semiconductor in a region near said junction;

a header element;

a rigid support member mounted on said header element and attached thereto;

a diaphragm attached to said support member, said diaphragm being characterized by a relatively high compliance, said support member being characterized by a relatively low compliance, said transducing subassembly being mounted between said header element and a specific location on said diaphragm, and means for mechanically joining said transducing subassembly between the two; and a coupling member attached at its periphery to said diaphragm, whereby pressure applied to said coupling member is converted to force transmitted through said diaphragm and said force applying means to said semiconductor.

2. A transducer assembly in accordance with claim 1 wherein said coupling member is a circular dome attached at its periphery to said diaphragm.

3. A transducer assembly in accordance with claim 2 wherein said header member and said support member are hermetically sealed to said diaphragm, said diaphragm having openings therethrough within the portion underlying said dome, thereby creating a volume at a static reference pressure.

4. A transducer assembly in accordance with claim 1 wherein said transducing element is mounted such that said semiconductor is attached to said header element and said force applying means has said second end attached to said diaphragm near the center thereof.

5. A transducer assembly in accordance with claim 2 wherein said semiconductor is a silicon NPN planar transistor, said diaphragm is formed of .0015 inch thickness beryllium copper and said dome is formed of .005 inch thick nickel.

6. A transducer assembly in accordance with claim 1 wherein said coupling member makes contact with said diaphragm at locations which vary under the action of the mechanical load.

7. A transducer in accordance with claim 6 wherein said coupling member makes contact with said diaphragm at a first series of points at loads below a specific load and thereafter the location of points of contact changes to a new set of points.

PO-1050
(5/69)

UNITED STATES PATENT OFFICE
CERTIFICATE OF CORRECTION

Patent No. 3,566,216 Dated February 23, 1971

Inventor(s) Gerhard Doering and Charles Kadlec

It is certified that error appears in the above-identified patent and that said Letters Patent are hereby corrected as shown below:

Column 1, line 32 reads 3,339,035, U.S. Pat. No. 3,283,271, U.S. Pat. No. 3,270,555 should read 3,339,085, U.S. Pat. No. 3,283,271, U.S. Pat. No. 3,270,555

Signed and sealed this 22nd day of June 1971.

(SEAL)
Attest:

EDWARD M.FLETCHER,JR.
Attesting Officer

WILLIAM E. SCHUYLER, JR.
Commissioner of Patents